July 15, 1930.  H. WAGNER  1,770,637
SEWER CHECK
Filed May 23, 1928

Inventor
H. Wagner.
By Lacey & Lacey, Attorneys

Patented July 15, 1930

1,770,637

UNITED STATES PATENT OFFICE

HENRY WAGNER, OF CHICAGO, ILLINOIS

SEWER CHECK

Application filed May 23, 1928. Serial No. 279,935.

This invention relates to a sewer check, and one object of the invention is to provide a check which may be disposed in a stand pipe through which water may pass from an areaway or the like into a sewer and serve to prevent water from backing up through the stand pipe and causing an areaway or cellar to be flooded.

Another object of the invention is to provide the sewer check with a valve or closure plate having a float connected therewith which serves not only to move the valve to a closed position when water rises in a stand pipe but will also constitute a weight to retain the valve in an opened position under normal conditions.

Another object of the invention is to so form the float that it will be disposed beneath the valve and prevented from projecting beyond a free end of the valve. By this arrangement a clear passage will be provided through which water may pass under normal conditions but when water rises in the stand pipe the float which normally constitutes a weight to retain the valve in an opened position may move the valve to a closed position.

Another object of the invention is to permit a head for the upper end of a tubular body of the sewer check to be easily removed when necessary and further cause the closure valve and float to be withdrawn when the head is removed.

The invention is illustrated in the accompanying drawing, wherein

Figure 1:
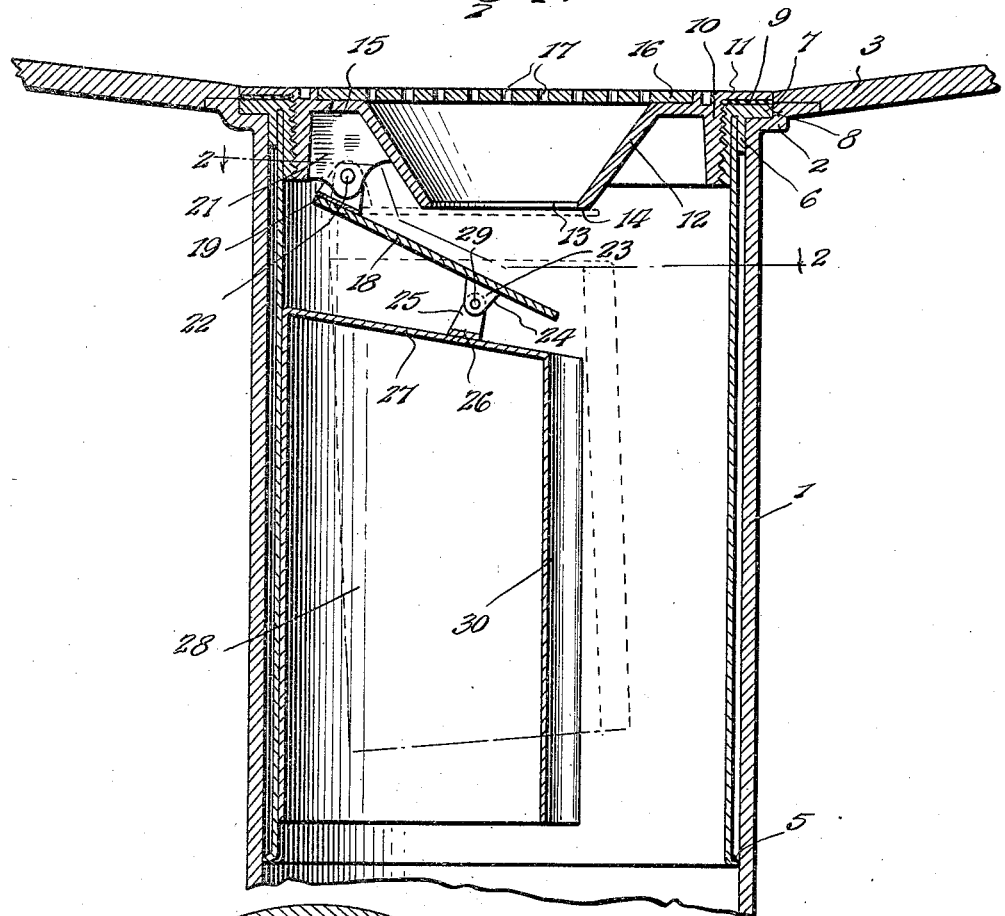
Figure 1 is a vertical sectional view through the improved sewer check.

The improved sewer check is intended to be disposed in a stand pipe 1 which extends vertically with its lower end communicating with a sewer pipe. At its upper end the stand pipe is formed with an outstanding annular flange or rim 2 over which cement 3 constituting a surface for an areaway or cellar may extend. The pipe 1 could also constitute a vertically extending down pipe for house plumbing.

The sewer check constituting the subject-matter of this invention includes a tubular body 4 which is formed of metal and of such diameter that it will fit loosely in the pipe 1 and thereby permit it to be easily inserted or removed. At its lower end the body is formed with an outstanding annular flange 5 to bear against the walls of the pipe and the upper end portion of the body fits into an annular groove formed in a collar 6. This collar fits snugly within the pipe and carries a flange 7 adapted to be received in an internal seat 8 defined by the collar 2, and from an inspection of Fig. 1 it will be seen that the collar has a flat upper face upon which rests a gasket 9 in order to form a water-tight closure when the head 10 is screwed into the collar with its annular flange 11 bearing against the gasket. By this arrangement a tight closure will be formed between the head 10 and the collar but when it is necessary to make repairs or clean the down pipe the head may be very easily removed. An opening is formed centrally in the head and about the opening extends a depending wall 12 which converges downwardly so that water will be directed towards a constricted opening 13, and about this opening 13 the lower edge of the depending wall defines a valve seat 14. A recess 15 extends about the upper end of the opening in the head and this recess constitutes a seat for a cover 16 in which any desired number of perforations 17 may be formed so that water may pass through the cover. It will be obvious that if the device is employed in the down pipe of house plumbing the perforated cover will be omitted.

Figure 2:
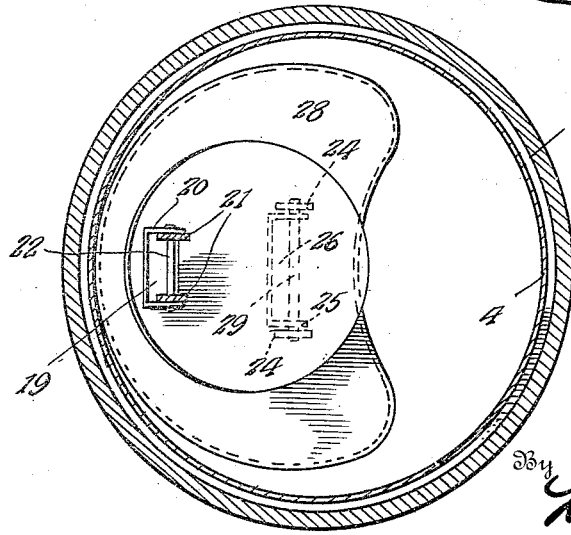
Fig. 2 is a transvere sectional view taken on the line 2—2 of Fig. 1.

In order to prevent water from moving upwardly through the downpipe and tubular body in case water backs up through a sewer, there has been provided a valve plate or disk 18 which consists of a metal disk preferably round, as shown in Fig. 2, and carrying a hinge bracket 19, the arms 20 of which extend upwardly into overlapping relation to hinge ears 21 formed integral with and depending from the head 10 at one side of the wall 12. A pivot pin 22 is passed through the arms 20 and hinge ears 21 and therefore, the valve disk will be pivotally mounted and may be swung from its open position shown in full lines in Fig. 1 to a closed position indicated by dotted lines in this figure. Against the under face of the valve disk is secured a bearing bracket 23 having depending hinge ears 24 at its ends and these ears 24 overlap companion ears 25 of a bearing bracket 26 carried by the upper wall 27 of a hollow metal float 28. A pin 29 is passed through the ears 24 and 25 and, therefore, the float will be pivotally connected with the valve and normally suspended therefrom, as shown in Fig. 1. The float is formed of metal and will have sufficient weight to normally swing the valve downwardly to an open position but when water moves upwardly in the stand pipe and enters the tubular body of the check air which is trapped in the float will cause the float to move upwardly as the water rises and the valve will be swung upwardly to a closed position and retained tightly closed until the level of the water in the stand pipe is lowered a sufficient distance to permit the float to again function as a weight and draw the valve downwardly. By this arrangement there will be no danger of the valve becoming stuck when in a raised position and failing to move downwardly to an open position. From an inspection of Fig. 2, it will be seen that the float is of materially less diameter than the interior of the tubular body and instead of being circular in top plan is formed with a flattened side wall 30 which is bowed inwardly. Therefore, a clear passage will be provided between the float and the side portion of the tubular body toward which the free end of the valve extends and water passing through the opening 14 and directed towards the last-mentioned portion of the walls of the body by striking the downwardly inclined valve may pass freely through the tubular body along the flattened wall 30 of the float and downwardly into the stand pipe.

Having thus described the invention, I claim:

1. In a sewer check, a tubular body adapted to fit within a sewer pipe, a head for the upper end of said body formed with an opening, a depending wall surrounding the opening and constituting a valve seat, a valve in said body pivotally connected with said head at one side of the opening and adapted to be swung upwardly into contact with the valve seat to close the opening, and a hollow float in said body closed at its upper end and having its upper end pivotally connected with the valve, the float being disposed beneath the valve and having a side portion beneath the free end of the valve terminating well away from the opposed portion of the wall of the tubular body to provide a passage through the body, the float serving to move the valve to a closed position when moved upwardly by water rising in the sewer pipe and body.

2. In a sewer check, a tubular body adapted to fit within a sewer pipe, a collar about the upper end of the body to engage the sewer pipe and suspend the body therein, a head for said body removably engaged with said collar and having an opening and a depending wall surrounding the opening and constituting a valve seat, a hinge ear at one side of the depending wall, a valve disk to seat against the valve seat disposed within the body and hinged to said hinge ear, a hollow float in said body closed at its top, and companion hinge ears extending from the valve and upper end of the float and pivotally connected to suspend the float from the valve, said float being disposed beneath the valve and terminating in spaced relation to the portion of the walls of the body opposite the free end of the valve to provide a clear passage through the body.

3. In a sewer check, a tubular body adapted to fit within a sewer pipe, a collar about the upper end of the body to engage the sewer pipe and suspend the body therein, a head for said body removably engaged with said collar and having an opening and a depending wall surrounding the opening and constituting a valve seat, a hinge ear at one side of the depending wall, a valve disk to seat against the valve seat disposed within the body and hinged to said hinge ear, a hollow float in said body closed at its top, and companion hinge ears extending from the valve and upper end of the float and pivotally connected to suspend the float from the valve, said float being disposed beneath the valve and having a flat side face extending in approximately the plane of the free end of the valve and spaced well away from the passage through the body.

In testimony whereof I affix my signature.

HENRY WAGNER. [L. S.]